O. C. CURRIE.

PAPER ROLL HOLDER.

APPLICATION FILED JAN. 6, 1916.

Reissued Oct. 31, 1916.

14,211.

Inventor

OTIS C. CURRIE.

Witness

Ernest Kirsner.

By Charles E. Wisner

Attorney

UNITED STATES PATENT OFFICE.

OTIS C. CURRIE, OF DETROIT, MICHIGAN, ASSIGNOR TO GEORGE F. KEARNEY, OF DETROIT, MICHIGAN.

PAPER-ROLL HOLDER.

14,211. Specification of Reissued Letters Patent. Reissued Oct. 31, 1916.

Original No. 1,117,342, dated November 17, 1914, Serial No. 830,332, filed April 8, 1914. Application for reissue filed January 6, 1913. Serial No. 70,689.

*To all whom it may concern:*

Be it known that I, OTIS C. CURRIE, a citizen of the United States, residing at Detroit, county of Wayne, State of Michigan, have invented a certain new and useful Improvement in Paper-Roll Holders, and declare the following to be a full, clear, and exact description of the same, such as will enable others skilled in the art to which it pertains to make and use the same, reference being had to the accompanying drawings, which form a part of this specification.

This invention relates to paper roll holders and its object is a device for retaining rolls of paper-towels, toilet paper or the like, in which the paper is in a continuous length preferably perforated at regular intervals crosswise of the strip whereby a portion desired for use may be readily separated from the roll and in which the arrangement of parts is such that the rotation of the roll is so limited that only a single sheet may be unwound at each actuation of the device, and, as the sheet is severed from the roll, the control parts automatically return to the original position preparatory for successive operations.

It is at present commonly the practice with manufacturers of paper of the character mentioned to supply the user with a number of holders or brackets desired without charge when buying a quantity of prepared rolls for use therewith.

It is one of the objects of this invention to provide a device for the purpose that is simple and automatic in operation and in which the cost of manufacture is reduced to a minimum.

Another object of the invention is a device of the character stated that is compact in form and in which the control parts for retaining the roll in position on the holder and the devices limiting the extent of rotation of the roll are wholly inclosed within the core upon which the paper is wound, whereby disarrangement of the parts by accident or intent is avoided.

These and other objects and novel features of construction are hereinafter more fully described and claimed and shown in the accompanying drawings in which—

Figure 1:
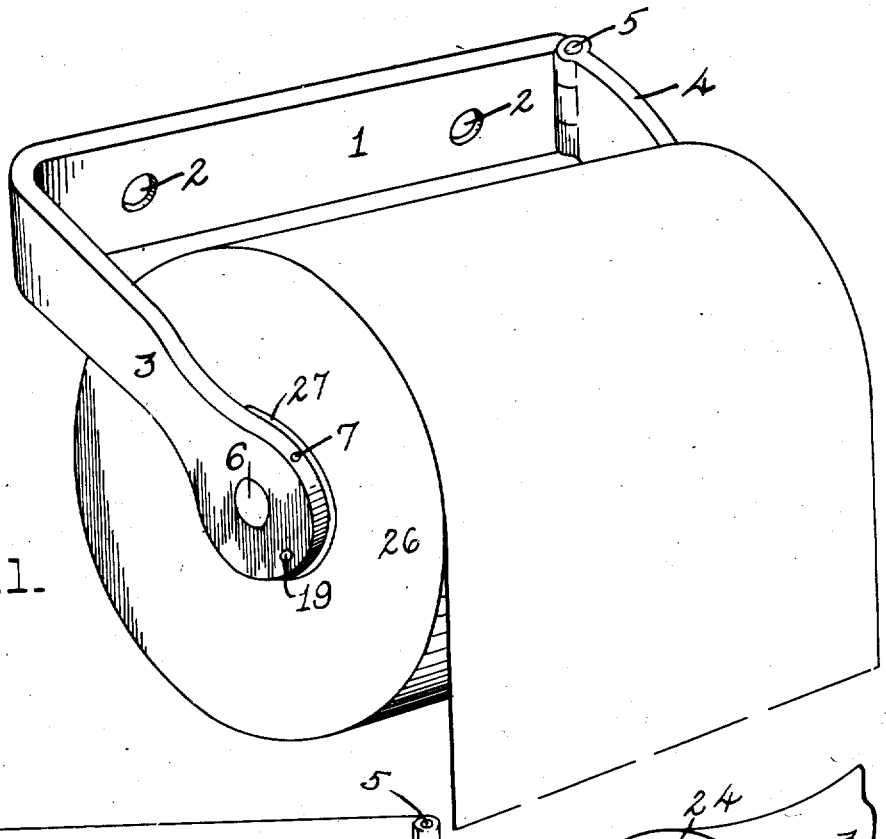
Figure 2:
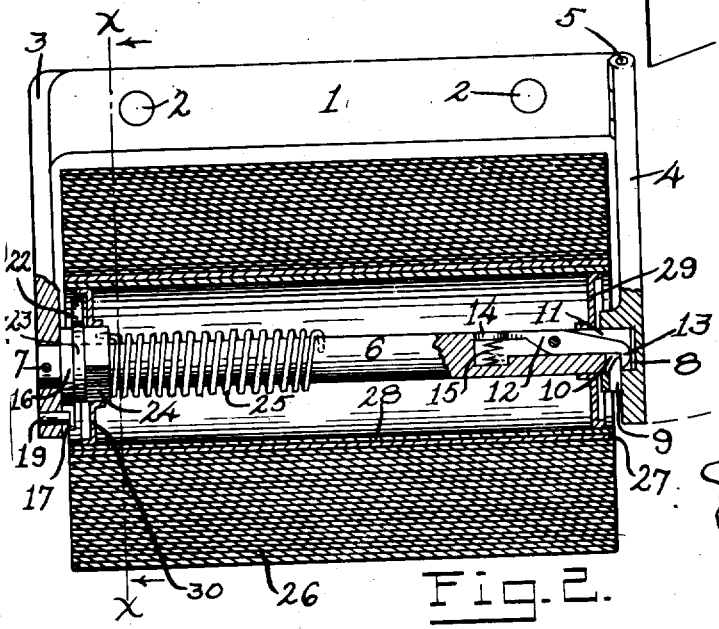
Figure 3:
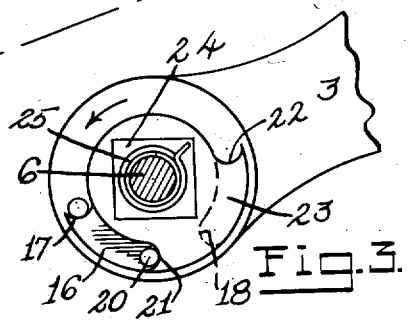
Figure 4:
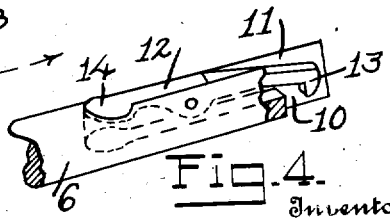

Figure 1 is a perspective view of my improved roll holder showing the paper roll in position thereon. Fig. 2 is a sectional view taken longitudinally of the holder and paper roll carried thereby. Fig. 3 is a view of the mechanism employed to limit the rotation of the roll taken on line $x$—$x$ of Fig. 2. Fig. 4 is a detail of the latch used to hold the bracket in the closed position.

Similar characters refer to similar parts throughout the drawings and specification.

The bracket 1 is provided with apertures 2, 2, for securing it to a wall or other convenient place of support and is also provided with a fixed arm 3 and a pivoted arm 4 hinged to the bracket at 5. The fixed arm 3 has a shaft or rod 6 fixedly secured thereto by means of a pin 7 passing through the end of the arm 3 and the shaft. The opposite end of the shaft or rod 6 rests in a socket 8 in the end of the pivoted arm 4 when closed as is shown in Fig. 2. A pin 9 is inserted through the wall of this socket 8 and when the parts are in the position shown in Fig. 2, this pin is positioned in a slot 10 in the end of the rod. The rod is also slotted at 11 on the upper side in which slot is pivotally secured the dog or latch 12 having a notched end 13 adapted to engage over the end of the pin 9 thus holding the pivoted arm 4 in position. The latch is positioned wholly within the slot 11 in the rod and is provided with an enlarged end 14 beneath which is a spring 15 tending to hold the notched end 13 in position over the end of the pin 9.

Loosely mounted on the shaft 6 and in contact with the fixed arm 3 is a pin engaging member 16 having notches 17 and 18 as is shown in Fig. 3, either of which may engage the pin 19 fixed in the end of the arm 3 which pin does not project beyond the inner face of the member 16. The member 16 is also provided with a pin 20 that may be engaged by the notches 21 or 22 of the pin engaging member 23 lying in contact with the similar member 16. The member 23 is provided with a square hub 24 and is also loosely mounted on the shaft 6. Encircling the shaft 6 is a coiled spring 25, one end of which is secured to the shaft, the opposite end being secured to the square hub 24, as is shown in Fig. 2. In assembling the spring and the pin engaging members or disks 16 and 23, the spring is placed under tension by being wound up. The pin 19 is then inserted in position in the end of the arm 3 with the notch 17 engaging thereagainst. The notch 21 of the disk 23 also by reason of the tension of the spring engages against the pin 20 which tends to rotate the disk 16 and hold the notch 17 against the pin 19. In looking at Fig. 3, it may be seen that the disk 23 may be rotated to the left in the direction of the arrow until the notch 22 thereon engages the pin 20 whereupon the member 16 will also be turned to the left and the notch 18 engages the pin 19 providing a stop and preventing further rotation in said direction, and upon release of the said members the spring will return the same to the original position shown in Fig. 3.

The paper roll 26 is ordinarily rolled upon a tubular pasteboard core 27. Within this tube 27 is preferably placed a second tube 28 secured to the tube 27 by the use of glue or otherwise, as may be desired. In the ends of the tube 28 I preferably insert metal end pieces or plates 29 and 30. The plate 29 has a central circular aperture preferably flanged to seat on the rod 6 as is shown in Fig. 2. The plate 30 is provided with a square flanged aperture at the center adapted to engage over the square hub 24. The aperture is of sufficient size to pass over the spring 25 when the roll is being placed on the rod 6, after which the swinging arm 4 is brought to the position shown in Fig. 2, with the end of the latch member 12 engaging over the pin 9. When assembled, it is impossible to remove the roll from the core, except by removing a sheet at a time as heretofore described. When the paper is entirely removed the core is broken to expose the latch member 12 which may then be depressed to release the pivoted arm 4. If so desired the inner tube 28 may be dispensed with in which case the metal end plates 29 and 30 may be pressed into the end of the paper roll core 27. As shown in Fig. 2, the plate 30 is pressed into the tube 28 a sufficient distance to allow the core to extend over the disks 16 and 23 so that the said parts are not exposed to view.

As is shown in Fig. 1, the end of the roll usually hangs loosely and the user, to secure a sheet of paper simply grasps this end of the roll pulling it forward, which act rotates the disks 23 and 16 in the manner heretofore described, until the notch 18 strikes the pin 19. This gives a sudden jar to the hand of the operator ordinarily sufficient to sever the sheet at the perforated line. The perforations in the sheet are at regular intervals, crosswise thereof, and the arrangement of the notched disks 16 and 23 allows of more than a single rotation of the roll, by reason of the fact that the companion notches in each of the disks are more than a half circle apart as may be seen in Fig. 3. As the sheet is severed from the roll the spring 25 rotates the roll in the opposite direction and resets the parts for successive operations.

It is thus readily seen that the device is very economical in use by reason of the fact that not more than a single sheet may be removed from the roll at a time and furthermore that the device is entirely automatic in operation and evidently inexpensive to manufacture and simple in construction, there being but few parts and these of such nature as not to require adjustment or readily become disarranged by accident or intent.

Having thus briefly described my invention, what I claim and desire to secure by Letters Patent of the United States is—

1. In a paper roll holder, a bracket having arms, a non-rotatable shaft extending between the arms detachably connected with one of the arms and supporting the roll, an element rotatable on the shaft limited in the extent of its rotation in either direction, the paper roll providing a means for rotating the element, and a spring tending to resist forward rotation of said element and adapted to return the element to its original position upon release of the roll.

2. In a paper roll holder, a bracket having arms, a non-rotatable shaft secured to one of the arms and adapted to detachably engage the other arm, an element rotatable on the shaft limited in the extent of its rotation in either direction, a core for the roll rotatable with said element, and a spring tending to resist forward rotation of the element and adapted to return the element to its original position upon release of the roll.

3. In a paper roll holder, a bracket having a fixed and a movable arm, a shaft carried by the fixed arm adapted to detachably support the movable arm, a core or spindle rotatable on the shaft, means rotatable with the spindle limiting the extent of its rotation in either direction, and a spring tending to resist forward rotation of said means adapted to return the said means and spindle to its original position upon release of the roll.

4. In a device of the character described, a bracket having a fixed and a pivoted arm, a shaft held from rotation carried by the fixed arm adapted to support a paper roll, the roll being rotatable on the shaft, means rotatable by the roll adapted to limit the extent of such rotation in either direction, the arrangement being such as to allow more than a single revolution of the roll, a spring attached to said means adapted to be wound up by said rotation whereby said means is returned to its original position upon release of the roll, and means carried by the shaft adapted to hold the pivoted arm in engagement therewith.

5. In a device of the character described, a bracket having a fixed and a pivoted arm, a shaft secured to the fixed arm, means for releasably securing the pivoted arm to the shaft, spring controlled means rotatable by the roll adapted to limit the extent of such rotation in either direction, the arrangement being such as to allow more than a single revolution of the roll, and a core for said roll inclosing said means, and the means for holding the pivoted arm in position.

6. In a paper roll holder, means rotatable by the roll adapted to limit the extent of its rotation in either direction, the arrangement being such as to allow more than a single revolution of the roll and a spring normally under tension attached to said means tending to resist its rotation in one direction.

7. In a paper roll holder, a bracket having a fixed and a movable arm, a shaft carried by the fixed arm, means on the shaft for detachably engaging the movable arm, a core or spindle rotatable on the shaft, a rotatable device limited in the extent of its rotation in either direction, a spring attached to said device normally under tension tending to resist rotation thereof in one direction, and means carried by the core or spindle engaging said device whereby rotation of the roll is limited.

8. In a device of the character described, a bracket, a shaft fixed thereon, a double notched disk rotatable on said shaft, means on the bracket adapted to be engaged by either of said notches whereby said disk is limited in the extent of its rotation in either direction, a second double notched disk rotatable on the shaft having a non-cylindrical hub, means on the first named disk adapted to be engaged by either notch of said second disk, a core for said roll, a plate carried by the core apertured to engage over said hub, and a spring having one end attached to the hub and the other end attached to the shaft adapted to resist rotation of said second plate and hub in one direction.

9. In a device of the character described, a bracket, a shaft carried thereby, a disk rotatable on said shaft, means limiting the extent of rotation of said disk in either direction, a second disk rotatable on the shaft having a non-cylindrical hub, means whereby rotation of said second disk relative to said first disk in either direction is limited, a core for a paper roll, a plate carried by the core apertured to engage over said hub, a spring having one end attached to the hub and the other end attached to the shaft adapted to resist rotation of said second disk and hub in one direction, and releasable means for retaining the roll on the shaft.

10. A device of the character described comprising a bracket having a fixed and a pivoted arm, a shaft carried by the fixed arm, said pivoted arm having a socket for the free end of the shaft, releasable means carried by the shaft adapted to hold said pivoted arm in position to support the shaft end, a double-notched disk adjacent the fixed arm rotatable on the shaft, a pin on said arm engageable by either of said notches whereby the extent of rotation of the disk in either direction is limited, a second notched disk rotatable on the shaft and having a non-cylindrical hub, a pin carried by the first disk engageable by either notch of the second disk, whereby the rotation of said second disk relative to the first disk is limited, a core for the paper roll, a plate carried by the core near one end apertured to engage over said hub, a spring normally under tension having one end attached to the said hub and the other attached to the said shaft adapted to resist rotation of said hub and second disk in one direction, and a plate in the opposite end of the core apertured to engage over the shaft.

11. In a paper roll holder, means for holding the roll from longitudinal movement, means rotatable by the roll arranged to allow more than a single rotation of the roll and limiting the extent of its rotation and a spring tending to resist rotation of said means in one direction.

12. In a paper roll holder, a bracket, means for rotatably supporting the paper roll thereon, a plurality of rotatable elements actuatable by rotation of the roll and each being limited in the extent of its rotation and together limiting the extent of rotation of the roll, and a spring tending to resist rotation of said element.

13. In a paper roll holder, a bracket, a non-rotatable shaft carried thereby, a rotatable element limited in the extent of its rotation in either direction, means rotatable on the shaft supporting the roll and engaging said element, and a spring tending to resist forward rotation of the element.

14. In a paper roll holder, a bracket, a shaft for the roll carried thereby, a plurality of elements rotatable on the shaft and actuatable by the roll, each element being limited in the extent of its rotation and the combined movement of the elements determining the extent of rotation of the roll, and a spring for returning the roll and co-actuated parts to their original relation.

15. In a paper roll holder, means for limiting the extent of rotation of the roll, consisting of an element loosely mounted on the roll support and rotatable by the roll, a spring tending to resist rotation of said element in one direction, and a second element coöperating with the said rotatable element limiting the extent of its rotation in a manner to allow more than a single revolution thereof.

16. In a paper roll holder, means for limiting the extent of rotation of the roll, consisting of an element rotatable by the roll, a spring tending to resist rotation of said element in one direction, and a second element coöperating with the said rotatable element limiting the extent of its rotation in a manner to allow more than a single revolution thereof.

17. In a paper roll holder, a bracket having arms, a shaft extending between the arms and detachably connected with one of the arms, a core for the roll, a device rotatable on the shaft and limited in the extent of its rotation in either direction, means for supporting the core and engaging the device whereby rotation of the core and roll may rotate the device, and a spring normally under tension tending to resist forward rotation of the device.

In testimony whereof I sign this specification.

OTIS C. CURRIE.